United States Patent [19]

Musta

[11] Patent Number: 5,385,435
[45] Date of Patent: Jan. 31, 1995

[54] TIE DOWN SYSTEM AND A METHOD OF USING SAME

[76] Inventor: Frederick A. Musta, 112 Danville Ct., Danville, Calif. 94526

[21] Appl. No.: 739,173

[22] Filed: Aug. 1, 1991

[51] Int. Cl.$^6$ .............................. F16G 11/10; B60P 7/08
[52] U.S. Cl. ................................. 410/102; 24/68 CD; 24/129 R; 410/98
[58] Field of Search .................. 410/3, 10, 11, 12, 23, 410/96, 97, 98, 99, 100, 101, 102, 103, 106; 24/68 CD, 68 CT, 265 H, 265 CD, 129 R

[56] References Cited

U.S. PATENT DOCUMENTS

| | | | |
|---|---|---|---|
| 240,866 | 5/1881 | Travers | 24/129 R |
| 1,472,840 | 11/1923 | Humphreys | 24/129 R |
| 2,370,358 | 2/1945 | Koch | 24/129 R X |
| 3,215,390 | 11/1965 | De Shetler | 24/265 CD X |
| 3,348,273 | 10/1967 | Hall | 410/23 |
| 4,157,171 | 6/1979 | Hasselas | 24/68 CT X |
| 4,214,350 | 7/1980 | Copelan | 24/68 CD X |
| 4,358,232 | 11/1982 | Griffith | 410/100 |
| 4,377,886 | 3/1983 | Golden | 24/68 CT X |
| 4,910,834 | 3/1990 | Minkler | 24/129 R |
| 5,008,983 | 4/1991 | Heins | 24/129 R X |

FOREIGN PATENT DOCUMENTS 8909350 10/1989 WIPO ................................. 410/97

Primary Examiner—Michael S. Huppert
Assistant Examiner—James T. Eller, Jr.
Attorney, Agent, or Firm—Douglas A. Chaikin

[57] ABSTRACT

A tie-down system for securing articles to a load bearing structure for storage or transportation is shown. Also shown is a method for using this system. The disclosed tie-down system includes a securing member having first and second ends and a fastener for fastening the securing member to the load bearing structure. The fastener includes two clip members connected to the securing member to accomplish this purpose. A tensioner is connected to the securing member and is placed between the two clip members. One of the clip members fixedly connects the securing member to the load bearing structure and the other clip member works in cooperation with the tensioner to apply the desired tension to the securing device and maintain that tension for securing articles to the load bearing structure.

14 Claims, 4 Drawing Sheets

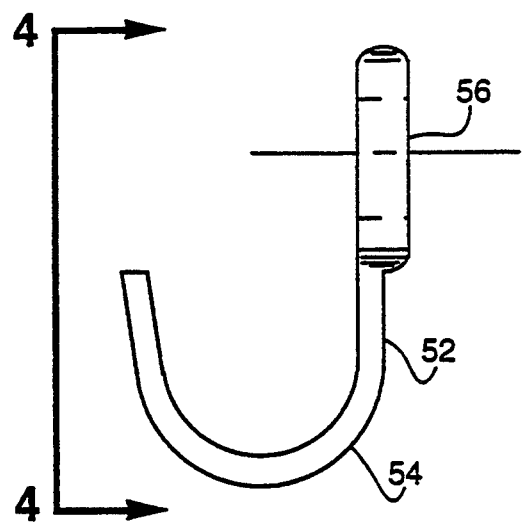
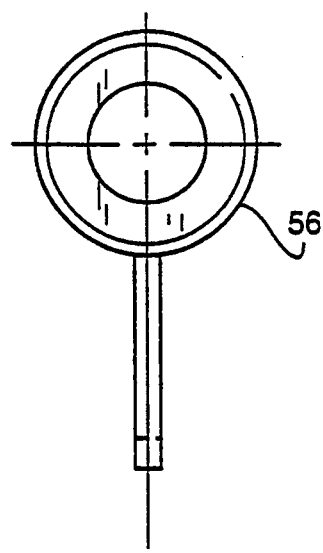
FIG. 3  FIG. 4
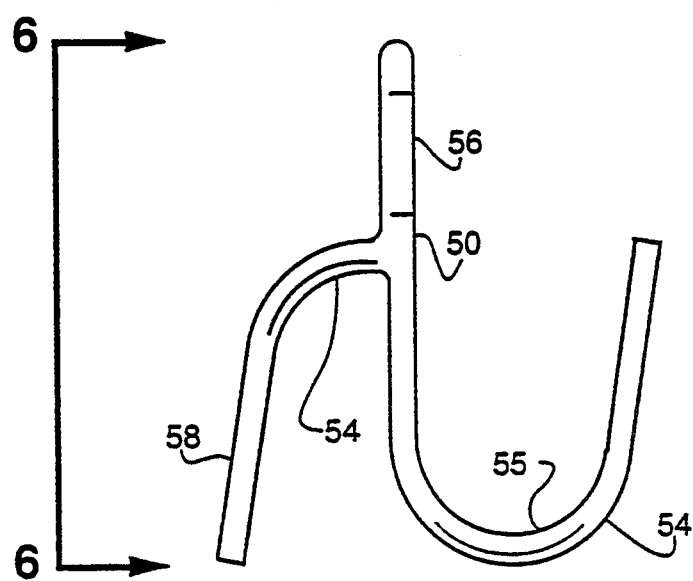
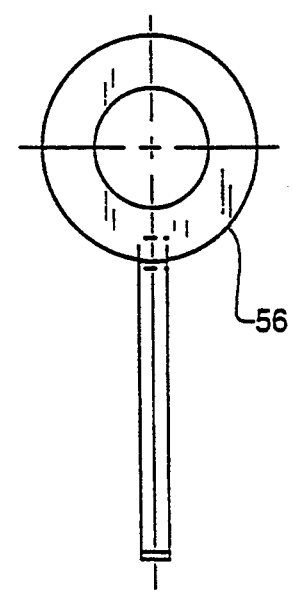
FIG. 5  FIG. 6

TIE DOWN SYSTEM AND A METHOD OF USING SAME

BACKGROUND OF THE INVENTION

1. Field of the Invention

This invention relates to tie-downs, and more particularly to a system and method for securing articles to a load bearing structure during storage or transportation.

2. Previous Art

Historically, teamsters have used systems of ropes and knots to secure articles to a load bearing structure during storage or transportation. Today these systems are commonly referred to as "tie-downs."

In the typical tie-down system, a rope is secured to one side of the truck bed. The remaining loose end of the rope is then coiled and thrown over the top of the load, falling to the ground on the opposite side of the truck.

The teamster then walks to the opposite side of the truck, where he picks up the loose end of the rope and fashions a special hitch in the rope at about shoulder height. This hitch is depicted schematically in FIG. 1 is known as a hay-haulers' hitch, a specific type of rope "tie-down."

The teamster will then pass the rope around some tie point at the side of the truck bed. He will bring the rope from the tie point back up to the special hitch, and pass the rope through the hitch's carefully fashioned loop.

He will pull down on the loose end of the rope. This action will apply tension between the tie point and the loop, and will result in the rope being tightened over the top of the load.

The hay-haulers' hitch includes three lengths of rope between loop and the tie point, (1) a first length descending from the hitch to the tie point, (2) a second length ascending from the tie point back to the loop, and (3) a third length descending from the loop into a user's hands. A mechanical advantage results which allows the user to apply much greater tension to the rope over the load than would be possible were the user pulling directly on the rope over the load.

To secure and lock the hitch, the user ties off the loose end of the rope at some convenient tie point, usually located at the side of the truck bed. A load is thereby made secure upon the bed of a truck.

If the user has correctly tied the hitch it will not come loose as the tension is adjusted. Additionally, if done correctly, the user will maintain his balance and avoid injury. And, if finally, done correctly the tie system will possess sufficient tension across the load so that the 10ad won't shift while the truck is moving.

A walk through any truck stop along major U.S. highways will provide one with the opportunity to observe properly tied and used hitchs, such as that depicted in FIG. 1. Yet, as common as these hitchs are, few outside the trucking industry possess the expertise to master the technique. The hitchs described above remain difficult, if not impossible for persons not having the expertise to tie correctly. Additionally, unless the user practices the tying of these hitchs regularly, the initial learning must be repeated.

As a result of these difficulties, two problems commonly result when a typical user attempts to make a teamsters' tie-down. Firstly, the hitch tends to come loose. This failure may quite likely cause the load to shift while the truck is in motion. Damage not only to the load but the truck are a likely outcome. Additionally, loose loads can be a danger to (1) the driver of the truck because it can be difficult to control the vehicle and (2) fellow motorists who either have to avoid an out of control truck or a spilled load.

Secondly and perhaps with equal frequency, the hitch slips while the tie-down is being adjusted. As the user pulls down on the rope to tighten it as the rope passes over the load, the hitch slips. The user may be thrown off balance and injured.

While the prior art shown in FIG. 1 may prove to be effective among skilled artisans, it has been left to the invention herein to provide a device which is both easy and safe to use. It has also been left to the invention herein to provide a device which secures either large or small loads to a wide variety of load bearing structures.

SUMMARY OF THE INVENTION

It is an object of this invention to provide a tie-down system and a method for securing articles to a load bearing structure during storage or transportation which is easy and safe to use.

It is yet a further object of this invention to provide a tie-down system, which, while easy and safe to use does not require the user to be a skilled and practiced artisan in order to use in a safe and effective manner.

In accordance with the above objects and those that will be mentioned and will become apparent below, the tie-down system for securing articles to a load bearing structure in accordance with the present invention, comprises:

securing means for securing articles to a load bearing structure, the securing means comprising an elongated, flexible body having first and second ends;

fastening means for fastening both ends of the securing means to the load bearing structure, the fastening means including first and second clip members, each clip member having an opening for compatibly accepting one end of the securing means; and tensioning means, connected to the securing means and located between the first and second clip members, for applying and maintaining a tensioning force to the articles through securing means in cooperation with the fastening means, whereby articles are secured to the load bearing structure by the tensioning force existing between the securing means and the fastening means.

In a preferred embodiment, the securing means comprises a rope-like structure of high tensile strength. The rope may be made from hemp, plastic or metal as appropriate.

In an additional preferred embodiment the fastening means clip members include hooks for securing the fastening means to a load bearing structure. In this preferred embodiment, the first clip member includes a first hook for securing the first clip member to the load bearing structure and a second hook for working in cooperation with the tensioning means and securing means for applying and maintaining tension to the securing means for securing the articles in place. The first and second hooks each have hook openings and the hook openings are open in directions opposite from one another.

In a still further preferred embodiment, the tensioning means includes a body having first and second end zones. The first end zone comprises a hook and the second end zone includes first and second legs. The first and second legs each have openings for accepting the securing means. The second leg has a notch at the distal end for locking the securing means after the appropriate amount of tension has been applied to the securing means.

Using the preferred embodiments, a user, with only minimal training, appropriately threads the securing means through the eyelets and openings, such that the securing means is threaded over the notch and ties off the securing means using the respective hooks of tensioning means and the fastening means.

The preferred method of using the tie-down system in accordance with this invention includes the steps of:
  providing the tie down system described above; connecting one end of the securing means to one of the clip members;
  fastening the one clip member to the load bearing structure;
  connecting the other end of the securing means to the tensioning member and the other clip member;
  securing the other clip member to the load bearing structure; and
  tightening the securing means so that the articles are secured to the load bearing structure;
  securing the other clip member to the load bearing structure; and
  tightening the securing means so that the articles are secured to the load bearing structure.

It is an advantage of this invention to provide a tie-down system and a method for securing articles to a load bearing structure during storage or transportation which are easy to use.

It is an additional advantage of this invention to provide a tie down system and a method which can be used in a variety of diverse applications.

It is yet an additional advantage of this invention to provide a tie down system and a method which may be with a variety of diverse size loads and load bearing structures.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIGS. 3-6 illustrate the first and second clip members of the fastener in accordance with this invention.

DETAILED DESCRIPTION OF THE INVENTION

Figure 1:
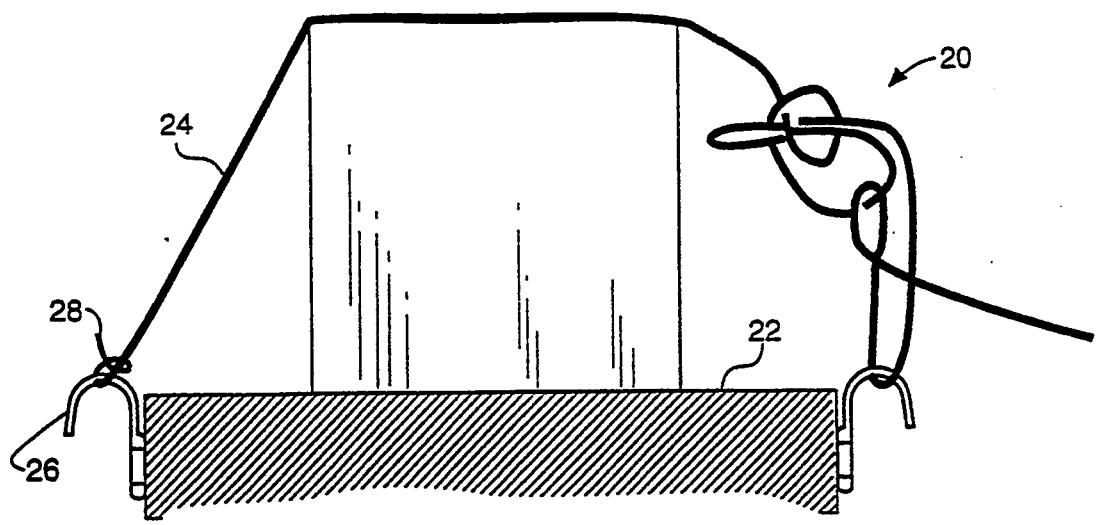
FIG. 1 illustrates a hay-haulers' hitch according to the prior art.

As described above the prior art is typified by a rope being tied into a hay-haulers' hitch such as that shown in FIG. 1 and generally designated by the numeral 20. Also as pointed out above, it takes considerable practice to develop the expertise to tie such a hitch. The general elements of tying the hay-haulers' hitch 20 and securing articles to a load bearing structure will now be described with reference to FIG. 1.

After the desired articles are placed on a load bearing structure, such as the bed 22 of a pickup truck, one end of a rope 24 is tied to a hook at the side of the bed 22 of a truck and the other end of the rope 24 is brought over the load to the opposite side of the bed 22. The other end of the rope is then crossed over the part of the rope 24 already securing the load. The securing part of the rope is pulled upwardly to form a loop which cradles the rope crossed over the securing part of the rope 24. Using the same end of the rope, the securing part of the rope 24 is formed into a second loop above the first loop. Then, the first loop is passed through the second loop and tightened, by pulling down on the remaining rope. The tightening as described above forms the hitch.

As an alternative to the hay-haulers' hitch 20, the tie down system in accordance with the instant invention is shown in FIGS. 2-14 and will now be described.

Figure 2:
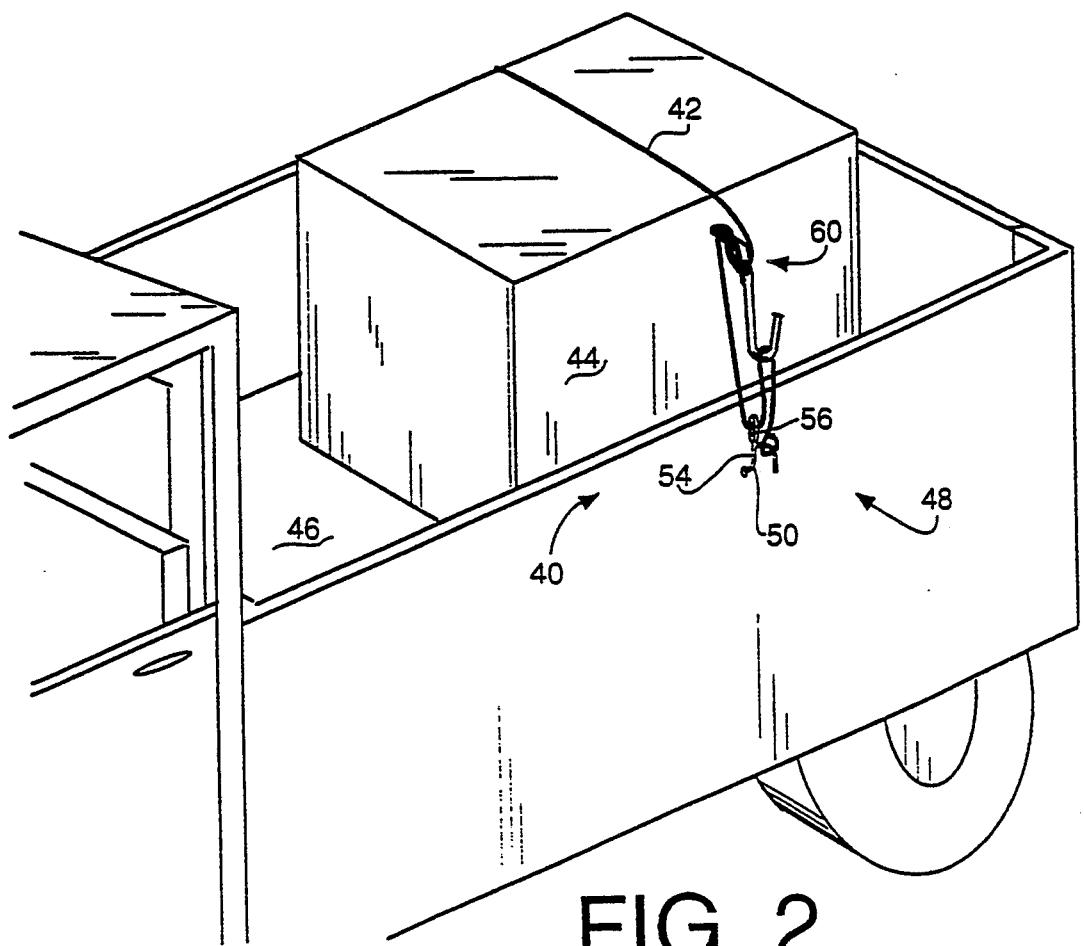
FIG. 2 illustrates a tie-down system in accordance with this invention.

FIG. 2 illustrates a tie down system in accordance with this invention, generally designated by the numeral 40. The tie down system 40 includes a securing member 42 for securing articles 44 to a load bearing structure 46.

The securing member 42 is an elongated, flexible body such as a rope, strap, cable, chain or similar structure. The securing member 42 may be made from twine, plastic, metal or other suitable substances.

The tie down system 40 additionally includes a fastener, shown generally by the numeral 48, having a first clip member 50 and a second clip member 52 (FIGS. 3-4). As best seen in FIGS. 3-6, each of the clip members 50 and 52, respectively, has a hook 54 for connecting the respective clip member 50 and 52 to the truck (or load bearing structure) and an eyelet 56 for accepting one end of the securing member 42.

The first clip member 50 has an additional hook 58 for securing and maintaining the securing member 42 in the locked position as will be more fully appreciated below. It will be appreciated from reference to FIGS. 5, 13-14, that each of the hooks, 54 and 58 respectively, define a hook opening 55 and 59, respectively. It will further be appreciated that each of the openings 55 and 59 are open in a direction opposite from one another.

It will be further appreciated that the hook opening 55 is open in a direction approximately 180° from the hook opening 59.

With respect to FIGS. 7-10, there is shown a tensioner 60 for applying and maintaining a tensioning force on the articles 44 through the securing member 42. The tensioner 60 is connected to the securing member 42 and positioned between the first and second clip members, 50 and 52, respectively.

The tensioner 60 includes a body 62 having a first end zone 64 and a second end zone 66. The first end zone includes a hook 67 having an opening 69. The second end zone 64 includes a first leg 68 and a second leg 70.

The first leg 68 has an opening 72 centrally located thereupon. The second leg 70 also has an opening 72 centrally located thereupon. Additionally, the second leg 70 has a notch 74 which is used to retain the securing member 42 in place as will be fully appreciated hereinafter.

Figure 10:
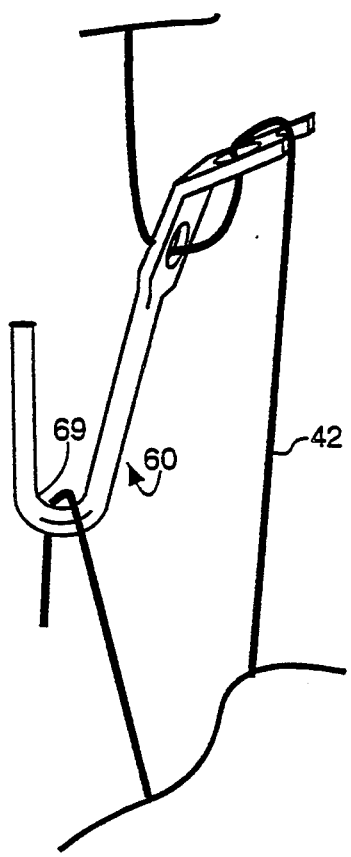
FIG. 10 illustrates the tensioning member of FIGS. 7-9 in use.

FIG. 10 illustrates the tensioner 60 in use. As can be seen, the securing member 42 is connected to the tensioner 60 by threading the securing member 42 through the openings 72. Additionally, the securing member 42 is threaded through openings 72 in such a way that the securing member 42 is pulled against the notch 74 when tension is created on the securing member 42 for securing the articles 44 to the load bearing structure. The securing member 42 is additionally threaded against the opening 69 of the hook 67. By threading the securing member 42 in such a fashion as shown in FIG. 10, the tensioner 60, in cooperation with the fastener 48, causes the securing member 42 to be locked in place.

Figure 11:
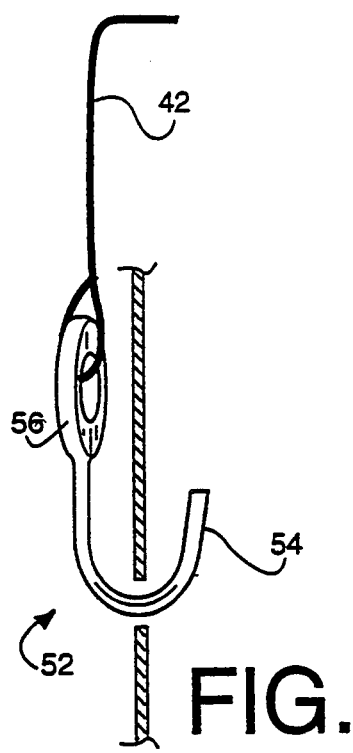
FIG. 11 illustrates one end of the securing member in accordance with this invention connected to the second clip member and the second clip member attached to a load bearing structure.

FIG. 11 illustrates the second clip member 52 fastened to the truck (or load bearing structure). It will be appreciated that the second clip member 52 is fastened to a hook or opening at the sidewall of the truck. It will also be appreciated that the sidewall of the truck is connected to the truck bed. Therefore, the second clip member 52 is connected to the load bearing structure.

FIG. 11 also illustrates one end of the securing member 42 connected to the eyelet 56 of the second clip member 52.

Figure 12:
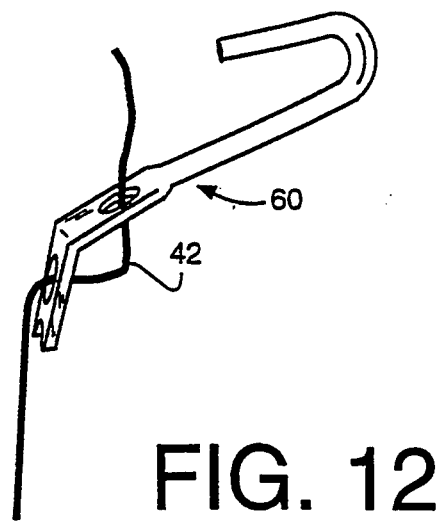
FIG. 12 illustrates the tensioning member connected to the securing member.

FIG. 12 illustrates the securing member 42 threaded through the openings 72 of the first and second legs, 68 and 70, respectively. The tensioner 60 is depicted in the orientation for allowing the securing member 42 to slide easily through the openings 72.

Figure 13:
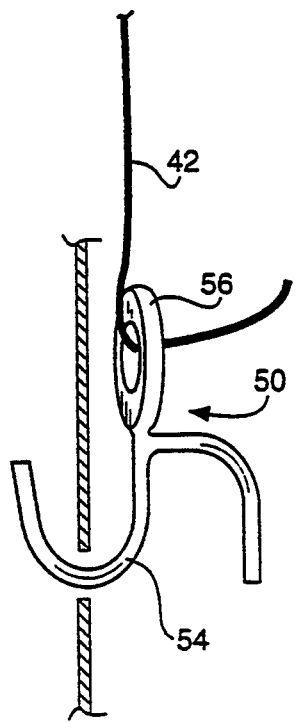
FIG. 13 illustrates the first clip member connected to the securing member and the load bearing structure.

FIG. 13 illustrates the first clip member 50 of FIGS. 5-6 having its hook 54 connected to the sidewalls of the truck in the same fashion as described with respect to the second clip member 52 of FIG. 11. And, in a manner substantially the same as the second clip member 52, the securing member 42 is connected to eyelet 56 of the first clip member 50.

Figure 14:
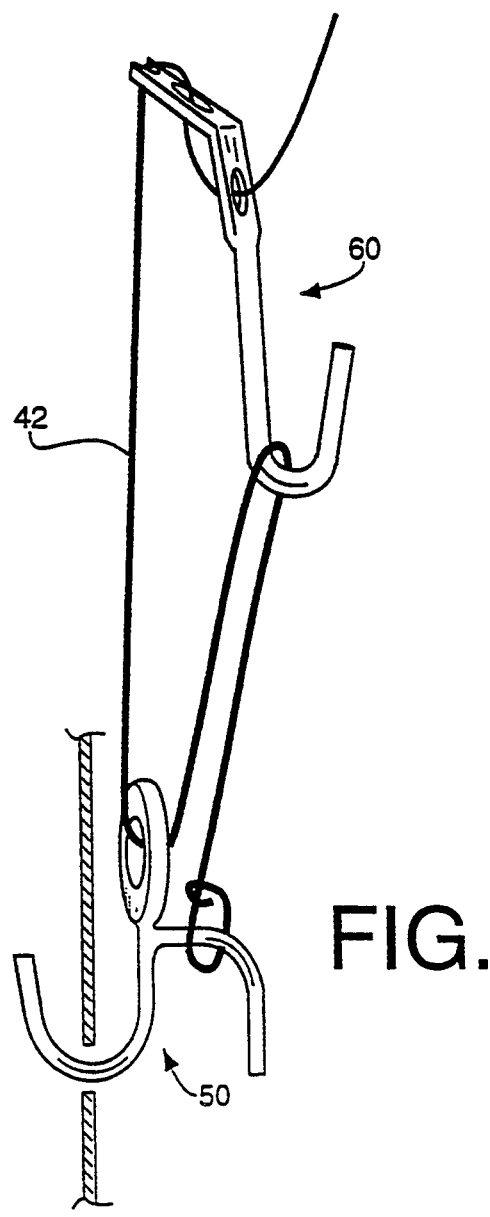
FIG. 14 illustrates a tie down system in accordance with this invention after the securing member has been secured between the clip members by the tensioning member.
Figures 7, 8, 9:
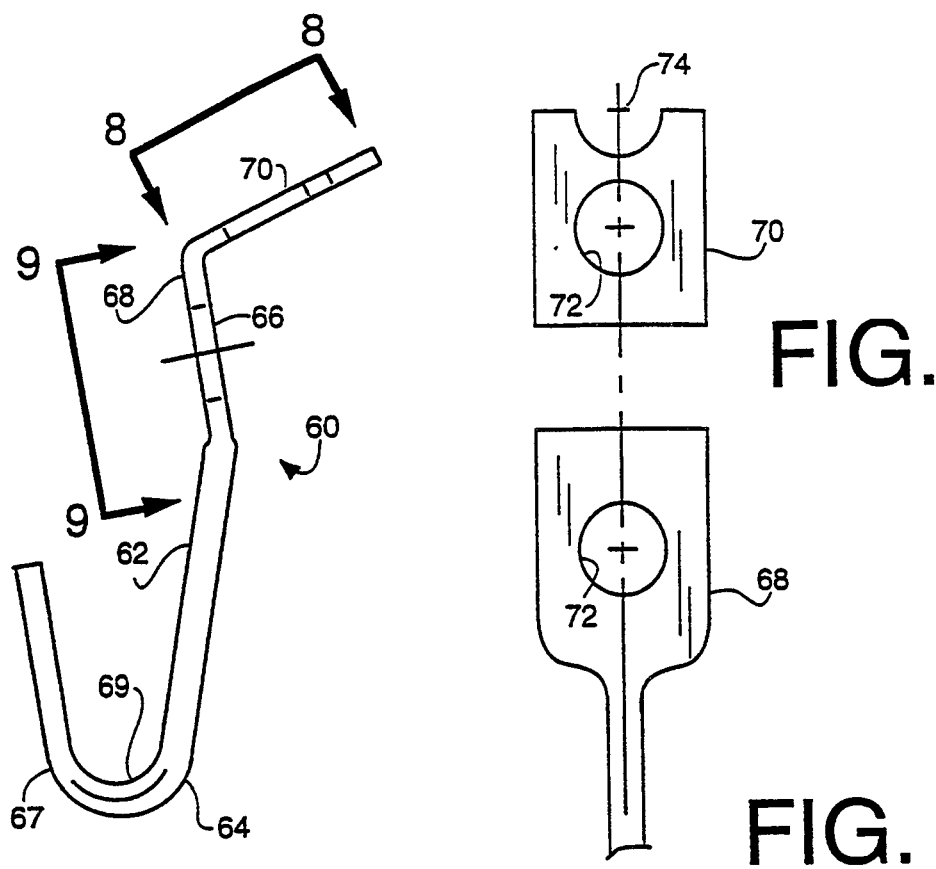
FIGS. 7-9 illustrate the tensioning member in accordance with this invention.

FIG. 14 illustrates the cooperation of the fastener 48 and the tensioner 60 to lock the securing member 42 in place. In use, the securing member 42 is threaded through the eyelets 56 of the clip members, 50 and 52 and the openings 72 of the tensioner 60. Particularly attention is paid to the manner of threading the tensioner 60 so that the securing member 42 is threaded across the notch 74. This condition is achieved by rotation of the tensioner 60 to a "locked" orientation, as shown best in FIGS. 10 & 14.

One end of the securing member 42 is secured fixedly to the second clip member 52 while the other end is threaded as described above. The securing member 42 is then pulled with as much tension as desired through all of the respective eyelets 56 and openings 72 to apply the amount of tension desired to the articles 44.

After the desired tension is achieved it must be maintained. This is done by looping the securing member 42 around the hooks 58 and 67 of the first clip member 50 and the tensioner 60, respectively. It will be appreciated prior to looping the securing member 42 that the hook openings 59 and 69 of the first clip member 50 and the tensioner 60, respectively should be facing in opposite directions and 180° of opposition has been found to be preferable.

It will be appreciated that the free end of the securing member 42 is then tied off and the notch 74 prevents the securing member 42 from slipping.

While the foregoing detailed description has described several embodiments of the tie-down system in accordance with this invention, it is to be understood that the above description is illustrative only and not limiting of the disclosed invention. Particularly, it should be noted that a variety of tensioners and fasteners may be used to work cooperatively with one another to produce substantially the desired results in accordance with the invention herein. Thus the invention is to be limited only by the claims as set forth below.

What is claimed is:

1. A tie-down system for securing articles to a load bearing structure, comprising:

securing means for securing articles to a load bearing structure, the securing means comprising an elongated, flexible body having first and second ends;

fastening means for fastening both ends of the securing means to the load bearing structure, the fastening means including first and second clip members, each clip member having an opening for compatibly accepting one end of the securing means, each of the clip members being removably connected to the load bearing structure, the first clip member including first and second hooks and an eyelet, the first hook being attached to the load bearing structure and the securing means is attached to the first clip member eyelet and the second end of the securing mans being attached to the second hook of the first clip member; and tensioning means, connected to the securing means and located between the first and second clip members, for applying and maintaining a tensioning force to the articles through securing means in cooperation with the fastening means, whereby articles are secured to the load bearing structure by the tensioning force existing between the securing means and the fastening means.

2. A tie-down system as described in claim 1 wherein the first clip member includes a body having a pair of hooks and an eyelet.

3. A tie-down system as described in claim 1, wherein the first clip member includes a body having a first hook on one end and an eyelet on the second end and a second hook between the first and second ends.

4. A tie-down system as described in claim 1, wherein the first clip member includes body having a first hook on one end and the first being open in a first direction and an eyelet on the second end and a second hook between the first and second ends and the second hook being open in a second direction.

5. A tie-down system as described in claim 4, wherein the second direction of the hook is a direction opposite from the first direction.

6. A tie-down system as described in claim 4, wherein the second direction of the hook is a direction approximately 180° from the first direction.

7. A tie-down system as described in claim 1, wherein the tensioning means comprises a body having first and second end zones, the first end zone includes a hook for compatible connection with the securing means, and the second end zone includes first and second legs each having an opening, and the second leg having a notch for securing and maintaining the securing means in place.

8. A tie-down system as described in claim 7, wherein the second end of the securing means passes through the opening of the tensioning means first leg in a first direction, then passes through the tensioning means second leg opening in an opposite direction, and then the body is rotated to fixedly engage the securing means in the tensioning means notch.

9. A tie-down system as described in claim 1, wherein the securing means is a rope.

10. A tie-down system as described in claim 1 wherein the securing means is a cable.

11. A tie-down system as described in claim 1 wherein the securing means is a strap.

12. A tie-down system as described in claim 1 wherein the securing means is a chain.

13. A tie-down system as described in claim 1, wherein the securing means is a nylon securing means.

14. A method for using a tie-down system for securing articles, comprising the steps of:
providing a tie down apparatus comprising:
securing means for securing articles to a load bearing structure, the securing means comprising an elongated, flexible body having first and second ends;
fastening means for fastening both ends of the securing means to the load bearing structure, the fastening means including first and second clip members, each clip member having an opening for compatibly accepting one end of the securing means, each of the clip members being removably connected to the load bearing structure, the first clip member including first and second hooks and an eyelet, the first hook being attached to the load bearing structure and the securing means is attached to the first clip member eyelet and the second end of the securing mans being attached to the second hook of the first clip member; and
tensioning means, connected to the securing means and located between the first and second clip members, for applying and maintaining a tensioning force to the articles through securing means in cooperation with the fastening means;
connecting one end of the securing means to one of the clip members;
fastening the one clip member to the load bearing structure;
connecting the other end of the securing means to the tensioning member and the other clip member;
securing the other clip member to the load bearing structure; and
tightening the securing means so that the articles are secured to the load bearing structure.

* * * * *